US011244697B2

(12) United States Patent
Li et al.

(10) Patent No.: US 11,244,697 B2
(45) Date of Patent: Feb. 8, 2022

(54) ARTIFICIAL INTELLIGENCE VOICE INTERACTION METHOD, COMPUTER PROGRAM PRODUCT, AND NEAR-END ELECTRONIC DEVICE THEREOF

(71) Applicant: Unlimiter MFA Co., Ltd., Eden Island (SC)

(72) Inventors: Jian-Ying Li, Taipei (TW); Kuo-Ping Yang, Taipei (TW); Ju-Huei Tsai, Taipei (TW); Ming-Ren Ma, Taipei (TW); Kuan-Li Chao, Taipei (TW)

(73) Assignee: PIXART IMAGING INC., Hsin-Chu County (TW)

( * ) Notice: Subject to any disclaimer, the term of this patent is extended or adjusted under 35 U.S.C. 154(b) by 298 days.

(21) Appl. No.: 16/286,687

(22) Filed: Feb. 27, 2019

(65) Prior Publication Data
US 2019/0295564 A1 Sep. 26, 2019

(30) Foreign Application Priority Data

Mar. 21, 2018 (TW) ................................. 107109671

(51) Int. Cl.
*G10L 25/03* (2013.01)
*G10L 25/27* (2013.01)
*G10L 15/22* (2006.01)
(52) U.S. Cl.
CPC .............. *G10L 25/03* (2013.01); *G10L 15/22* (2013.01); *G10L 25/27* (2013.01); *G10L 2015/225* (2013.01)

(58) Field of Classification Search
CPC ......... G10L 25/03; G10L 25/27; G10L 15/22; G10L 2015/225; G10L 2025/783; G10L 25/48; G10L 25/87
USPC ............................................................ 704/9
See application file for complete search history.

(56) References Cited

U.S. PATENT DOCUMENTS

| 6,002,677 | A  | * | 12/1999 | Javitt   | .................. | H04Q 11/0478 |
|           |    |   |         |          |                    | 370/329      |
| 6,718,302 | B1 | * | 4/2004  | Wu       | ..........................| G10L 25/87   |
|           |    |   |         |          |                    | 381/94.3     |
| 6,775,653 | B1 | * | 8/2004  | Wei      | .......................... | H04B 3/23    |
|           |    |   |         |          |                    | 379/406.01   |
| 6,873,953 | B1 | * | 3/2005  | Lennig   | ..................... | G10L 25/87   |
|           |    |   |         |          |                    | 704/248      |
| 7,263,074 | B2 | * | 8/2007  | LeBlanc  | .................. | G10L 25/78   |
|           |    |   |         |          |                    | 370/286      |

(Continued)

Primary Examiner — Thuykhanh Le
(74) Attorney, Agent, or Firm — Bacon & Thomas, PLLC

(57) ABSTRACT

An artificial intelligence voice interaction method and a near-end electronic device thereof are disclosed. The method includes the following steps: receiving a voice input by a user; transmitting the voice to a remote artificial intelligence server; determining whether the voice has ended; when determining that the voice has ended and has not received a stop recording signal transmitted by the remote artificial intelligence server, it stops transmitting the voice to the remote artificial intelligence server; before determining that the voice has ended, and has received the stop recording signal from the remote artificial intelligence server, it stops transmitting the voice to the remote artificial intelligence server; and receiving a response signal send back from the remote artificial intelligence server.

15 Claims, 5 Drawing Sheets

(56) References Cited

U.S. PATENT DOCUMENTS

| | | | | |
|---|---|---|---|---|
| 8,712,211 B2* | 4/2014 | Watanabe | G11B 27/105 | 386/239 |
| 8,880,043 B1* | 11/2014 | Albinson | H04L 51/32 | 455/414.3 |
| 9,818,407 B1* | 11/2017 | Secker-Walker | G10L 15/32 | |
| 10,388,298 B1* | 8/2019 | Gopalan | H04B 3/466 | |
| 10,847,149 B1* | 11/2020 | Mok | G10L 15/08 | |
| 2001/0049604 A1* | 12/2001 | Ito | H04M 3/4938 | 704/270.1 |
| 2003/0156711 A1* | 8/2003 | Takahashi | H04R 3/02 | 379/406.01 |
| 2004/0064314 A1* | 4/2004 | Aubert | G10L 25/87 | 704/233 |
| 2005/0165604 A1* | 7/2005 | Hanazawa | G10L 15/05 | 704/201 |
| 2005/0209858 A1* | 9/2005 | Zak | H04W 76/45 | 704/275 |
| 2005/0256719 A1* | 11/2005 | VanOrman | G08C 17/02 | 704/275 |
| 2006/0122831 A1* | 6/2006 | Jeong | G10L 25/78 | 704/231 |
| 2006/0195315 A1* | 8/2006 | Sato | G10L 13/06 | 704/207 |
| 2006/0287859 A1* | 12/2006 | Hetherington | G10L 25/87 | 704/260 |
| 2007/0038778 A1* | 2/2007 | Miao | H04L 65/4038 | 709/246 |
| 2008/0065381 A1* | 3/2008 | Matsumoto | G10L 21/0364 | 704/254 |
| 2008/0120104 A1* | 5/2008 | Ferrieux | G10L 15/30 | 704/246 |
| 2008/0226058 A1* | 9/2008 | Das | H04M 3/527 | 379/265.12 |
| 2009/0041212 A1* | 2/2009 | Erhart | H04M 3/2281 | 379/88.16 |
| 2009/0109942 A1* | 4/2009 | Wijayanathan | H04W 76/28 | 370/338 |
| 2010/0026815 A1* | 2/2010 | Yamamoto | G03B 17/00 | 348/207.1 |
| 2010/0035593 A1* | 2/2010 | Franco | H04M 3/56 | 455/416 |
| 2010/0121636 A1* | 5/2010 | Burke | G10L 25/78 | 704/233 |
| 2011/0301950 A1* | 12/2011 | Ouchi | G10L 15/28 | 704/231 |
| 2013/0132089 A1* | 5/2013 | Fanty | G10L 15/30 | 704/270 |
| 2013/0253933 A1* | 9/2013 | Maruta | B60R 16/0373 | 704/246 |
| 2013/0325475 A1* | 12/2013 | Chung | G10L 15/04 | 704/253 |
| 2013/0332159 A1* | 12/2013 | Federighi | G10L 15/26 | 704/235 |
| 2014/0036023 A1* | 2/2014 | Croen | H04N 7/147 | 348/14.01 |
| 2014/0172421 A1* | 6/2014 | Liu | H04R 1/1083 | 704/227 |
| 2015/0012270 A1* | 1/2015 | Reynolds | G11B 27/19 | 704/233 |
| 2015/0134341 A1* | 5/2015 | Tamura | G06F 3/04842 | 704/275 |
| 2015/0287411 A1* | 10/2015 | Kojima | G10L 17/22 | 704/246 |
| 2015/0302855 A1* | 10/2015 | Kim | G10L 15/08 | 704/275 |
| 2015/0332675 A1* | 11/2015 | Yasuda | A47L 9/2847 | 15/319 |
| 2016/0124706 A1* | 5/2016 | Vasilieff | G10L 15/22 | 704/275 |
| 2016/0125883 A1* | 5/2016 | Koya | G10L 15/30 | 704/232 |
| 2016/0171971 A1* | 6/2016 | Suskind | G09B 19/04 | 704/260 |
| 2018/0108351 A1* | 4/2018 | Beckhardt | G06F 3/167 | |
| 2018/0343024 A1* | 11/2018 | Sahebjavaher | G06F 1/163 | |
| 2019/0267028 A1* | 8/2019 | Kawano | G10L 15/187 | |

* cited by examiner

ARTIFICIAL INTELLIGENCE VOICE INTERACTION METHOD, COMPUTER PROGRAM PRODUCT, AND NEAR-END ELECTRONIC DEVICE THEREOF

BACKGROUND OF THE INVENTION

1. Field of the Invention

The present invention relates to an artificial intelligence voice interaction method and a near-end electronic device thereof, particularly to an artificial intelligence voice interaction method and a near-end electronic device thereof capable of speeding up processing.

2. Description of the Related Art

With the advancement of technology, many voice assistant programs have been developed, such as Apple's Siri, Google's Google Now, Microsoft's Cortana or Amazon's Alexa. A user can directly speak with a voice assistant program using a device such as a mobile phone or a tablet.

Hereafter please first refer to FIG. 1 which is a flowchart showing steps in an artificial intelligence voice interaction method in the prior art. First, the near-end electronic device 91 performs Step S101 to receive a voice input by the user, while the near-end electronic device 91 simultaneously starts recording. Then, Step S102 is also performed to transmit the voice to the remote artificial intelligence server 92. The remote artificial intelligence server 92 receives the voice in Step S103, and then determines in Step S104 that whether the voice has ended or whether a complete sentence has been formed. The remote artificial intelligence server 92 can use the semantic analysis to determine, but the present invention is not limited thereto.

When the remote artificial intelligence server 92 knows that the voice has ended or has formed a complete sentence, Step S105 is performed to transmit a stop recording signal. When the near-end electronic device 91 receives the stop recording signal, Step S106 is performed to stop the recording, and the transmission of the voice to the remote artificial intelligence server 92 is also stopped. At this time, the remote artificial intelligence server 92 proceeds to Step S107 to generate a response signal based on all or part of the voice, allowing the near-end electronic device 91 to receive it.

In Step S104 of the prior art, one of the detection methods by the remote artificial intelligence server 92 is to determine whether the voice has ended. However, the remote artificial intelligence server 92 is installed in the cloud, which causes the time for the signal to go back and forth, thus prolonging the processing time, and may cause judgment errors.

Accordingly, it is necessary to devise a new artificial intelligence voice interaction method and a near-end electronic device thereof to solve the problem in the prior art.

SUMMARY OF THE INVENTION

It is a major objective of the present invention to provide an artificial intelligence voice interaction method with the effect of speeding up processing.

It is another major objective of the present invention to provide a near-end electronic device used for the method described above.

To achieve the above objectives, the artificial intelligence voice interaction method in the present invention is used for a user to employ a near-end electronic device and can be fulfilled by a remote artificial intelligence server. The method comprises the following steps: receiving a voice input by a user; transmitting the voice to the remote artificial intelligence server; determining whether the voice has ended; when determining that the voice has ended and has not received a stop recording signal transmitted by the remote artificial intelligence server, it stops transmitting the voice to the remote artificial intelligence server; before determining that the voice has ended, and has received the stop recording signal from the remote artificial intelligence server, it stops transmitting the voice to the remote artificial intelligence server; and receiving a response signal sent back from the remote artificial intelligence server.

The near-end electronic device in the present invention is used by a user and is connected to a remote artificial intelligence server via a network. The near-end electronic device includes a microphone, a transmission module, a near-end processing module and a voice module. The microphone is used for receiving a voice input by a user. The transmission module is electrically connected to the microphone for transmitting the voice to the remote artificial intelligence server. The near-end processing module is electrically connected to the transmission module for determining whether the voice has ended. Specifically, when the near-end processing module determining that the voice has ended and has not received a stop recording signal transmitted by the remote artificial intelligence server, it stops transmitting the voice to the remote artificial intelligence; and before determining that the voice has ended, and has received the stop recording signal from the remote artificial intelligence server, it stops transmitting the voice to the remote artificial intelligence server. The voice module is electrically connected to the near-end processing module for issuing a response signal sent back from the remote artificial intelligence server.

A computer program product in the present invention is stored in a computer readable medium to read and execute to achieve the method as described above.

DETAILED DESCRIPTION OF THE PREFERRED EMBODIMENT

Hereafter, the technical content of the present invention will be better understood with reference to preferred embodiments.

Figure 1:
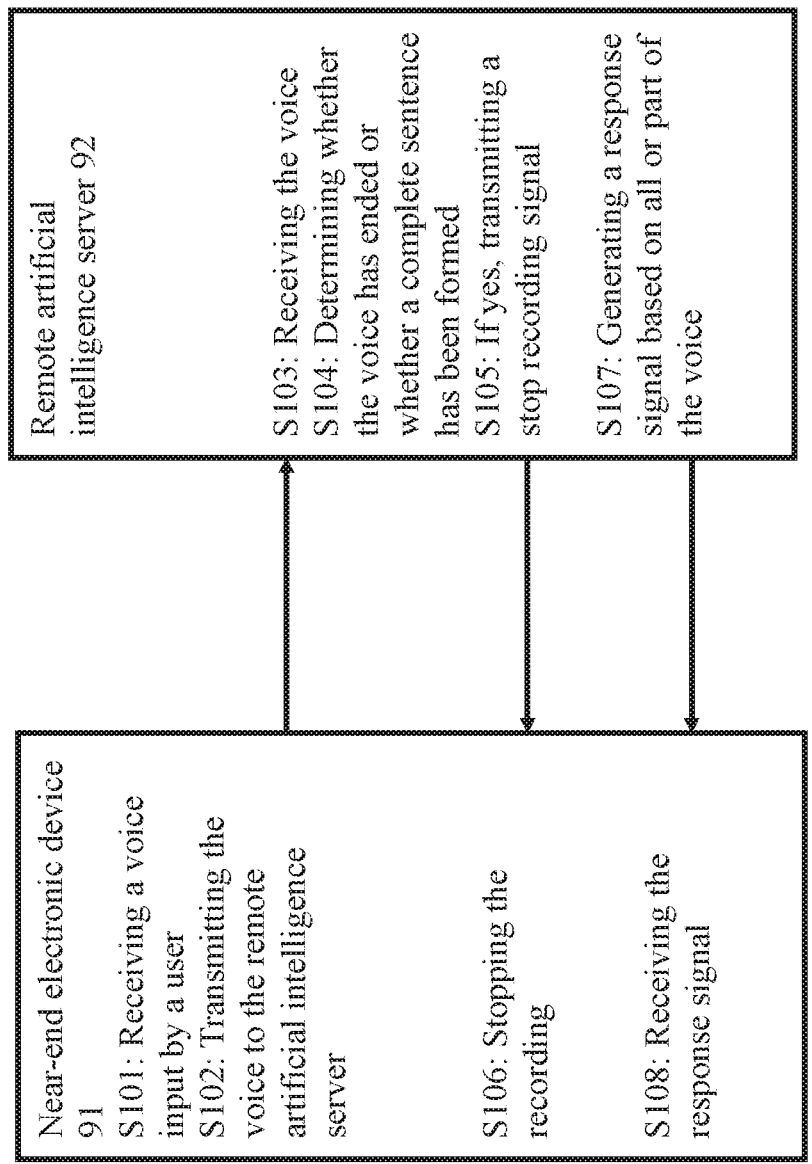
FIG. 1 is a flowchart showing steps in an artificial intelligence voice interaction method in the prior art.
Figure 2:
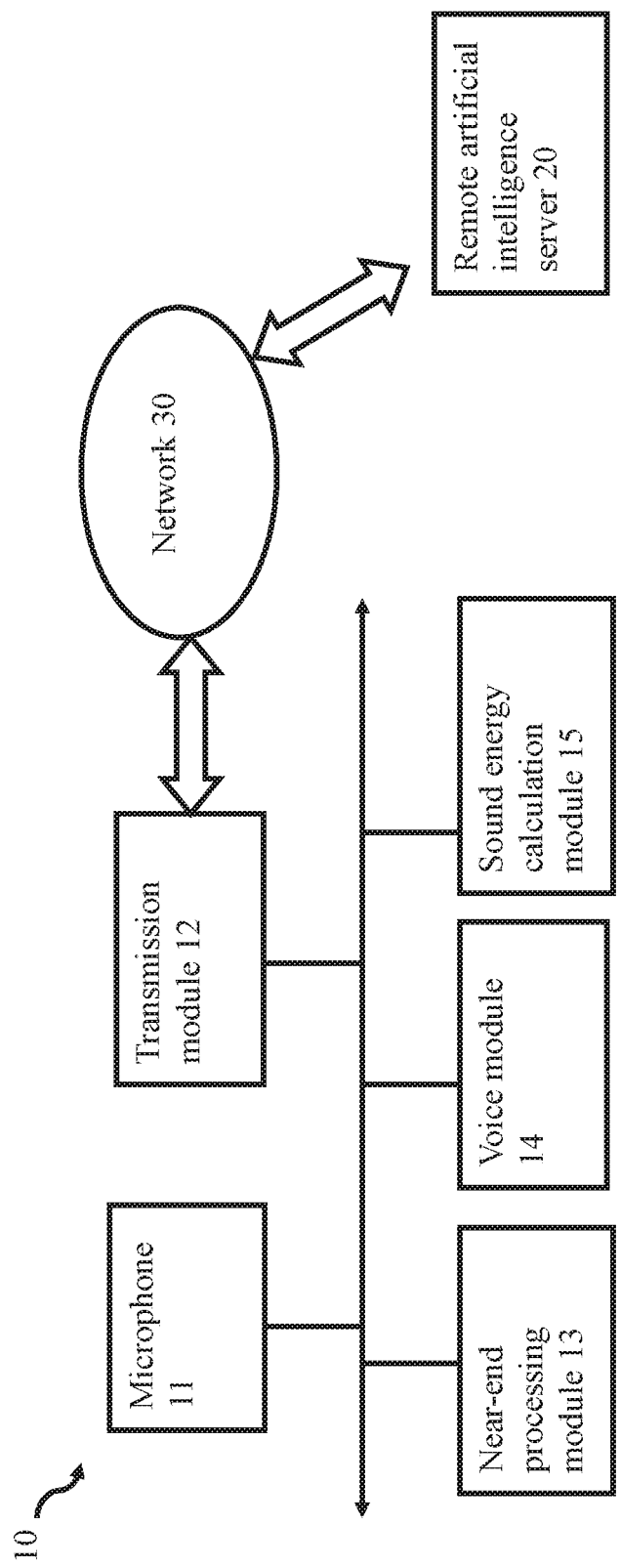
FIG. 2 is an architecture diagram of a near-end electronic device and a remote artificial intelligence server in the present invention.

Hereafter please first refer to FIG. 2 for an architecture diagram of a near-end electronic device and a remote artificial intelligence server in the present invention.

The near-end electronic device 10 in the present invention may be a smart phone, a tablet or a notebook computer, but the present invention is not limited thereto. The near-end electronic device 10 is used by a user and is connected to a remote artificial intelligence server 20 via a network 30. The remote artificial intelligence server 20 can be used for any artificial intelligence voice system, such as Apple's Siri, Google's Google Now, Microsoft's Cortana, or Amazon's Alexa, but the present invention is not limited thereto.

The near-end electronic device 10 includes a microphone 11, a transmission module 12, a near-end processing module 13, a voice module 14 and a sound energy calculation module 15. The microphone 11 is configured to receive a voice input by the user to record the voice. The transmission module 12 is connected to the microphone 11 to transmit the voice to the remote artificial intelligence server 20 via the network 30. The transmission module 12 can be wired or wirelessly connected to the network 30, but the present invention does not limit its connection method. The near-end processing module 13 is electrically connected to the transmission module 12 for converting the voice into a numerical value for analysis, thereby determining whether the voice has started or ended. When the voice starts, the near-end processing module 13 can first perform the numerical conversion of the voice, and then simultaneously transmit the voice to the remote artificial intelligence server 20.

When the near-end processing module 13 determines that the voice has ended and has not received a stop recording signal transmitted by the remote artificial intelligence server 20, it stops recording the voice first, and then stops transmitting the voice to the remote artifact intelligence server 20. In addition, before the near-end processing module 13 determines that the voice has ended and has received the stop recording signal transmitted by the remote artificial intelligence server 20, it stops transmitting voice to the remote artificial intelligence server 20. The remote artificial intelligence server 20 can analyze and process the voice and respond to the near-end electronic device 10 so that the voice module 14 can emit the response signal.

It should be noted that since the near-end processing module 13 generally has a slower operation speed than the remote artificial intelligence server 20, and determining whether the voice is a complete sentence will consume more time and resources, in the present embodiment, whether the voice is a complete sentence is determined by a large number of operations through the remote artificial intelligence server 20. The near-end processing module 13 mainly determines whether the voice has ended. Since the determination of the end of the voice by the near-end processing module 13 can increase the processing speed, the near-end processing module 13 uses the method of sound energy value to determine whether the voice has ended. The deficiencies are then reinforced by the judgment mechanism of the remote artificial intelligence server 20, for example, the voice has not ended yet but the complete sentence is followed by a meaningless voice. However, the present invention is not limited to the above judgment method.

The sound energy calculation module 15 is used for calculating a sound energy value, and then comparing the sound energy values before and after to obtain a sound energy comparison value. When the sound energy calculation module 15 calculates and gets that the sound energy comparison value is greater than a start threshold, it may represent a voice starts, so the near-end processing module 13 records the voice. The start threshold may be 10 dB, but the present invention is not limited thereto. The near-end processing module 13 then determines whether the sound energy comparison value is less than an end threshold. The end threshold may be −10 dB, but the present invention is not limited thereto. If it is less than the end threshold, the near-end processing module 13 determines that the voice may have ended. Since the sound energy comparison value is obtained by comparing the present calculated sound energy value with the previously calculated sound energy value, the sound energy comparison value (calculated every 0.2 sec) is only less than the end threshold at the end of the voice. Next time the sound energy comparison value is calculated, since the voice has ended, the sound energy comparison value will not be less than the end threshold, but will be greater than the end threshold. Then, the near-end processing module 13 determines whether the sound energy comparison value is not greater than a start threshold within a time interval and is not less than an end threshold. If both are not greater than a start threshold, and not less than an end threshold, the near-end processing module 13 determines that the voice has ended. Specifically, the sound energy calculation module 15 calculates the sound energy comparison value every 0.2 sec, and the time interval is 0.6 sec. In other words, in the case of calculating the sound energy comparison value once every 0.2 sec, when the sound energy comparison value is less than the end threshold, to avoid that the tone pause is determined as the buffer value given by the end of the voice, the three consecutive sound energy comparison values (i.e. 0.6 sec) being not greater than the start threshold and not less than the end threshold can be used to confirm that the voice has ended, but the present invention is not limited to the value.

It should be noted that each module included in the near-end electronic device 10 may be a hardware device, a software program combined with a hardware device, or a firmware combined with a hardware device, etc. For example, a computer program product may be stored in a computer-readable medium to be read and executed to achieve the functions of the present invention, but the present invention is not limited to the above manner. Further, the preferred embodiments of the present invention described above are merely illustrative. To avoid redundancy, all the possible combinations of changes are not documented in detail. However, it shall be understood by those skilled in the art that each of the modules or elements described above may not be necessary. For the implementation of the present invention, the present invention may also contain other detailed, conventional modules or elements. Each module or component is likely to be omitted or modified depending on the needs. Other modules or elements may not necessarily exist between two of any modules.

Figure 3:
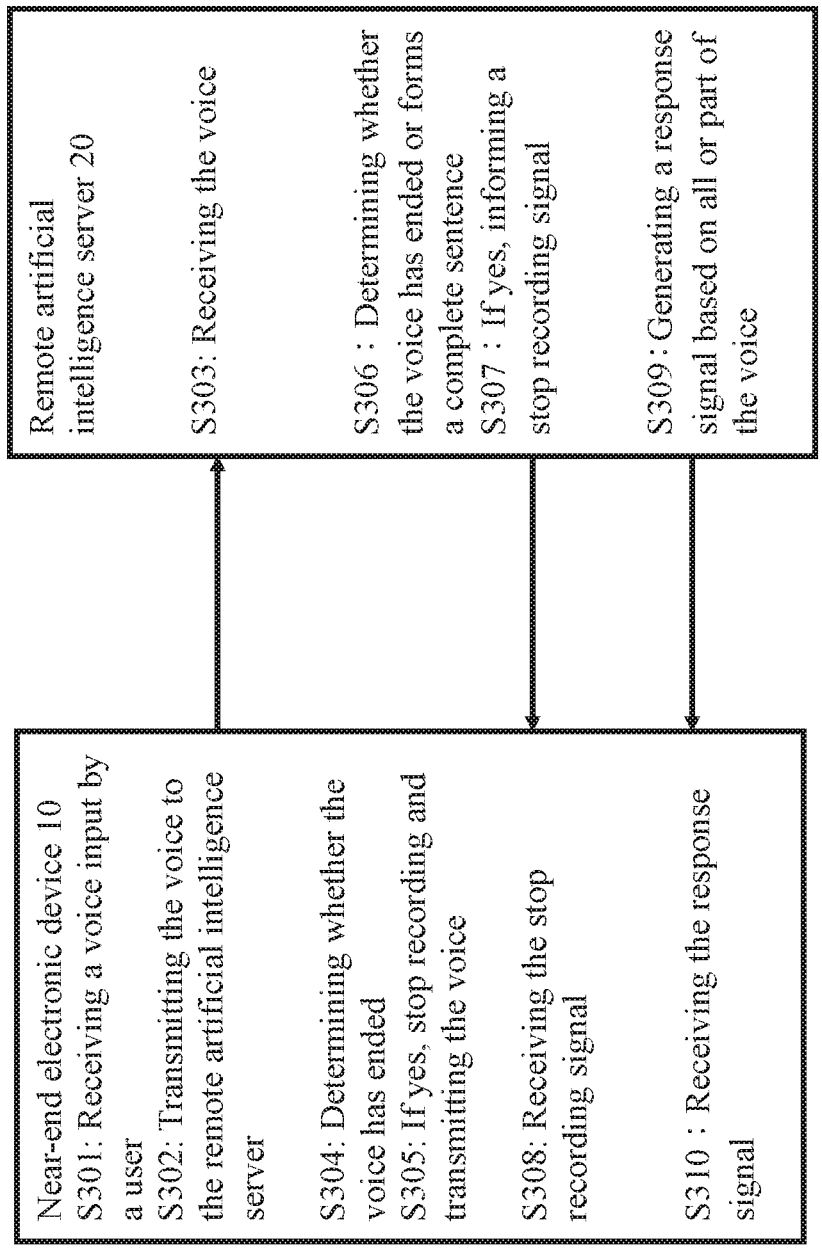
FIG. 3 is a flowchart showing steps in an artificial intelligence voice interaction method according to a first embodiment of the present invention.

Then, please refer to FIG. 3 which is a flowchart showing steps in an artificial intelligence voice interaction method according to a first embodiment of the present invention. It should be noted here that although the near-end electronic device 10 and the remote artificial intelligence server 20 are used as an example to illustrate the artificial intelligence voice interaction method of the present invention, the artificial intelligence voice interaction method in the present invention is not limited to the use of the near-end electronic device 10 and the remote artificial intelligence server 20 using the same structure as described above.

Step S301 is first performed in the near-end electronic device 10: Receiving a voice input by a user.

First, the near-end electronic device 10 uses the microphone 11 to receive the voice input by the user. At this time, the near-end processing module 13 can also perform simultaneous recording.

Next, in Step S302: Transmitting the voice to the remote artificial intelligence server.

The near-end electronic device 10 uses the transmission module 12 to transmit the voice to the remote artificial intelligence server 20 via a network 30.

Then, Step S303 is performed in the remote artificial intelligence server 20: Receiving the voice.

At this time, the remote artificial intelligence server 20 will continue to receive the voice.

Step S304 is performed in the near-end electronic device 10: Determining whether the voice has ended.

Figure 5:
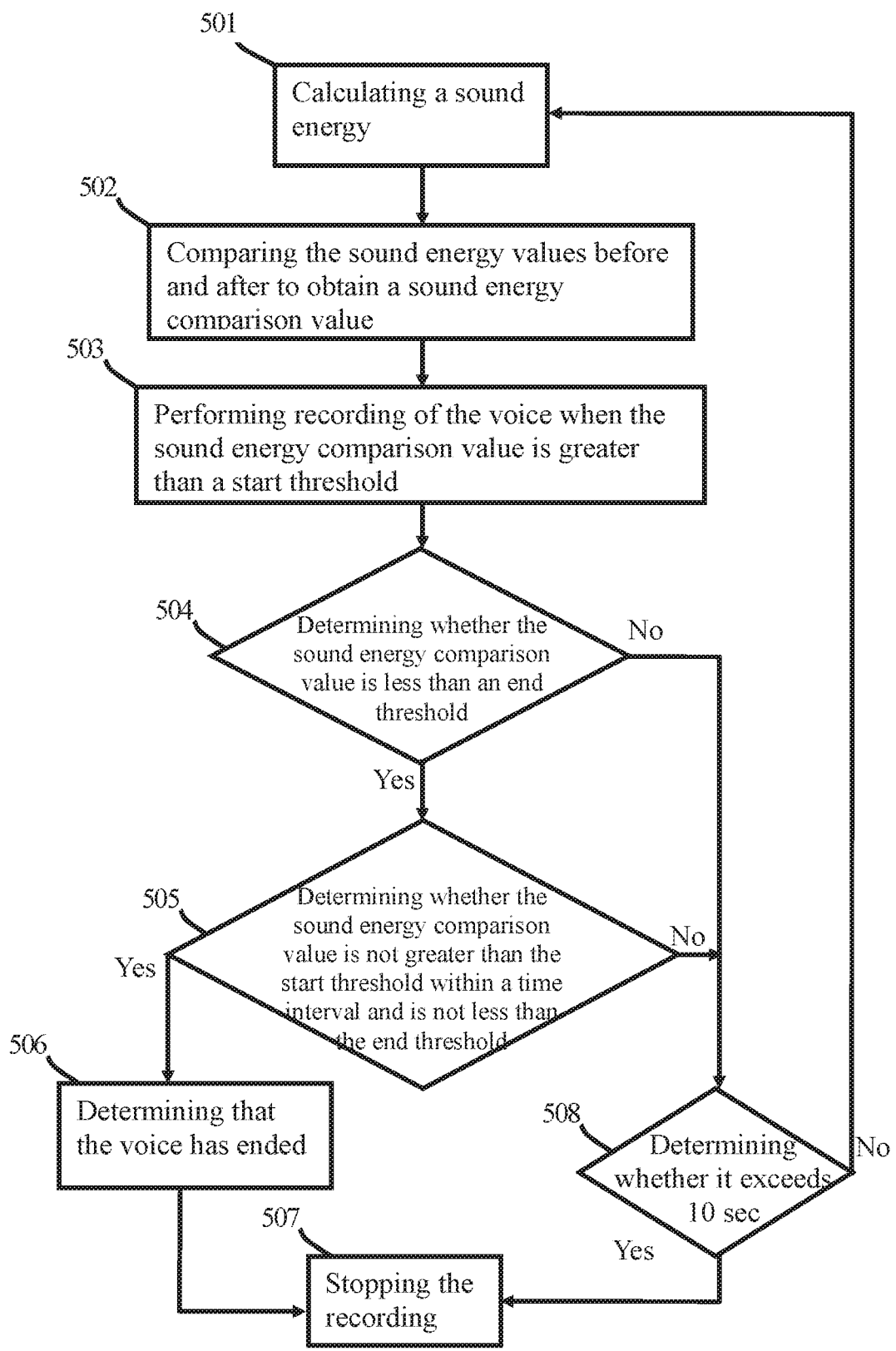
FIG. 5 is a flowchart of a near-end electronic device that uses sound energy to determine whether voice has ended.

The near-end processing module 13 can determine whether the voice has ended by determining whether the voice is a complete sentence or calculating the value of the sound energy, but the present invention is not limited thereto. The method of calculating the sound energy value will be described in detail in the flowchart description as shown in FIG. 5.

Then, in Step S305: If yes, stop recording and transmitting the voice.

In a first embodiment of the present invention, if it is confirmed by the near-end processing module 13 that the voice has ended, immediately stop recording and stop transmitting voice to the remote artificial intelligence server 20.

At this time, the remote artificial intelligence server 20 also performs Step 306: Determining whether the voice has ended or forms a complete sentence.

The remote artificial intelligence server 20 also makes a judgment. The remote artificial intelligence server 20 may use semantic analysis to confirm whether the voice has ended or form a complete question or answer.

Then, the remote artificial intelligence server 20 performs Step S307: If yes, inform a stop recording signal.

At this time, the remote artificial intelligence server 20 transmits the stop recording signal to the near-end electronic device via the network 30.

Accordingly, the near-end electronic device 10 will perform Step S308: Receiving the stop recording signal.

The near-end electronic device 10 will receive the stop recording signal. However, the near-end processing module 13 actually stops recording in Step S305. Therefore, the near-end processing module 13 does not perform other actions in Step S308.

The remote artificial intelligence server 20 will perform Step S309: Generating a response signal according to the voice.

At this time, the remote artificial intelligence server 20 generates a response signal based on all or part of the recognized voice to be sent back to the near-end electronic device 10.

Finally, the near-end electronic device 10 performs Step S310: Receiving the response signal.

The near-end electronic device 10 receives the response signal to emit it through the voice module 14.

Figure 4:
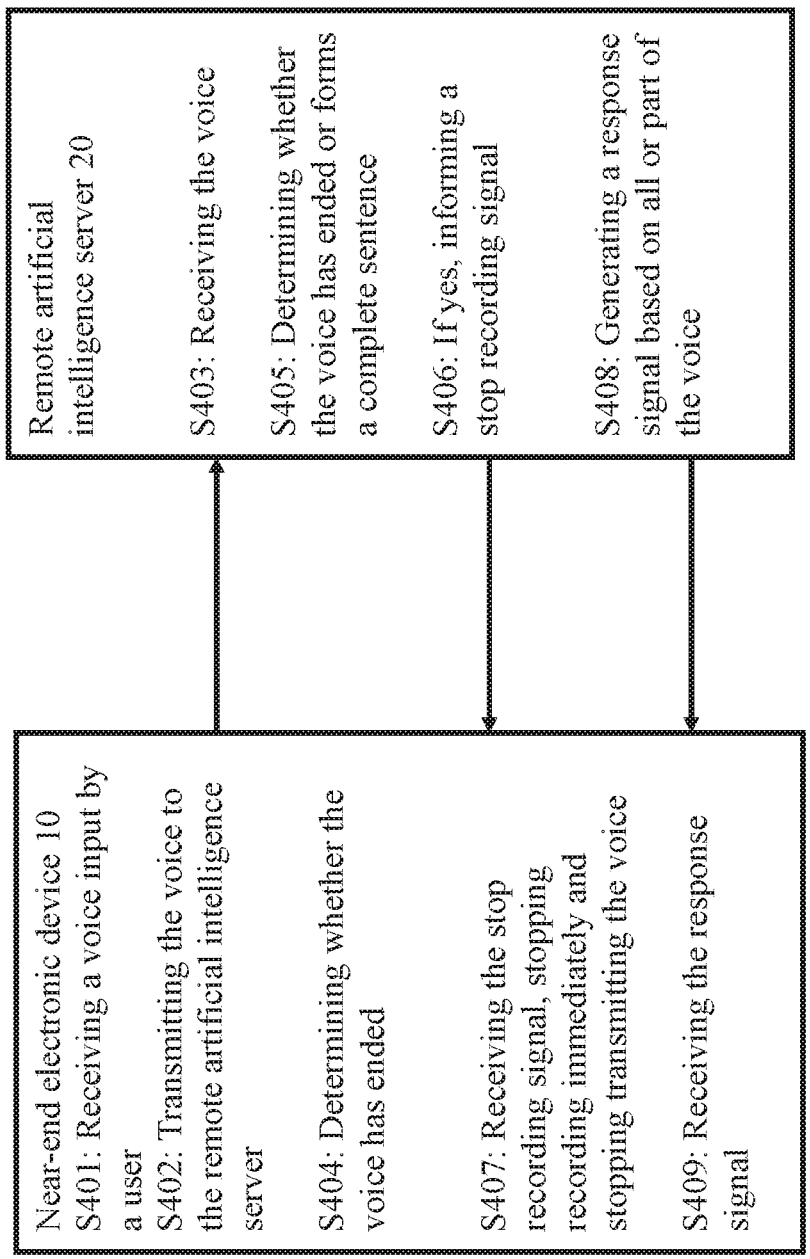
FIG. 4 is a flowchart showing steps in an artificial intelligence voice interaction method according to a second embodiment of the present invention.

Then, please refer to FIG. 4 which is a flowchart showing steps in an artificial intelligence voice interaction method according to a second embodiment of the present invention.

First, Step S401 is performed in the near-end electronic device 10: Receiving a voice input by the user and performing Step S402: Transmitting the voice to the remote artificial intelligence server, so as to record and transmit the voice to the remote artificial intelligence server 20, that is, Step S403: Receive the voice.

Next, the near-end processing module 13 performs Step S404: Determining whether the voice has ended, and at this time, the remote artificial intelligence server 20 also performs Step S405: Determining whether the voice has ended or forms a complete sentence.

In the second embodiment of the present invention, if the remote artificial intelligence server 20 first uses semantic analysis to confirm whether the voice has ended or forms a complete question or answer, the remote artificial intelligence server 20 proceeds to Step S406: Informing a stop recording signal.

At this time, the near-end electronic device 10 performs Step S407: Receiving the stop recording signal, stopping recording immediately and stopping transmitting the voice.

When the near-end electronic device 10 receives the stop recording signal, it immediately stops recording, and certainly stops transmitting voice to the remote artificial intelligence server 20.

At this time, the remote artificial intelligence server 20 performs Step S408: Generating a response signal according to the voice, so that the near-end electronic device 10 can perform Step S409: Receiving the response signal to emit the response signal through the voice module 14.

Then, please refer to FIG. 5 which is a flowchart of a near-end electronic device that uses sound energy to determine whether voice has ended.

First, in Step 501: Calculating a sound energy.

The sound energy calculation module 15 calculates the sound energy of the voice received by the microphone 11; its unit can be decibels. The sound energy calculation module 15 can be calculated every 0.2 sec.

Then, in Step 502: Comparing the sound energy values before and after to obtain a sound energy comparison value.

The sound energy calculation module 15 calculates a new sound energy value every 0.2 sec, and the near-end processing module 13 then compares the sound energy values before and after, to obtain a sound energy comparison value.

Then, in Step 503: Performing recording of the voice when the sound energy comparison value is greater than a start threshold.

When the near-end processing module 13 confirms that the sound energy comparison value is greater than a start threshold, for example, when the sound energy value before and after is greater than 10 dB, the near-end processing module 13 confirms that it has started receiving voice and recording.

Next, in Step 504: Determining whether the sound energy comparison value is less than an end threshold.

When the near-end processing module 13 determines that the sound energy comparison value is less than the end threshold, the near-end processing module 13 determines that the voice may have ended.

Accordingly, Step 505 is performed again: Determining whether the sound energy comparison value is not greater than the start threshold within a time interval and is not less than the end threshold.

Next, the near-end processing module 13 determines whether the sound energy comparison value within a time interval is not greater than the start threshold and not less than the end threshold. For example, all sound energy comparison values within the 0.6 second time interval are not greater than 10 dB and not less than −10 dB.

If both are not greater than the start threshold and not less than the end threshold, then in Step 506: Determining that the voice has ended.

At this time, the near-end processing module 13 determines that the voice has ended, and proceeds to Step 507: Stopping the recording.

However, if it is determined in Step 504 that the sound energy comparison value is not less than the end threshold, or in Step 505, the sound energy comparison value is greater than the start threshold or less than the end threshold, Step 508 is performed: Determining whether it exceeds 10 sec.

Although it is determined in Step 504 or Step 505 that the voice has not ended yet, if the recording time is too long, for example, it has exceeded 10 sec, the near-end processing module 13 can enforce Step 507 to end the recording. Otherwise, it can return to the original Step 501 to recalculate sound energy.

It should be noted here that the artificial voice interaction method of the present invention is not limited to the order of the above steps. As long as the objectives of the present invention can be achieved, the order of the above steps can also be changed.

In this way, according to the above first and second embodiments, the user can talk with the remote artificial intelligence server 20 through the near-end electronic device 10. Since the remote artificial intelligence server 20 is asynchronous with the near-end electronic device 10, after transmitting the stop signal, the remote artificial intelligence server 20 will start to send response and wait for the near-end electronic device 10 to receive without confirming whether the near-end electronic device 10 has stopped recording and stopped transmitting. The channel the near-end electronic device 10 receives the response sent back by the remote artificial intelligence server 20 must be the same with the channel the near-end electronic device 10 transmits voice to the remote artificial intelligence server 20. Therefore, the sooner the recording and transmitting voice is stopped, the faster the response will be received and the response will be played. In the first embodiment of the invention, since there is no need to wait for the remote artificial intelligence server 20 to transmit the stop recording signal, the recording and the transmission of the voice may be stopped earlier. Thus, the near-end electronic device can receive and play immediately when the remote artificial intelligence server 20 transmits the response. In the second embodiment, the near-end electronic device 10 can only stop recording and stop transmitting voice after the remote artificial intelligence server 20 transmits the stop recording signal. At this time, although the remote artificial intelligence server 20 is ready to send a response, the near-end electronic device still stops recording and stops transmitting the voice, and cannot immediately receive the response transmitted by the remote artificial intelligence server 20. Therefore, in the first embodiment, the processing speed between the near-end electronic device 10 and the remote artificial intelligence server 20 for artificial intelligence voice interaction can be increased, and the voice judgment error can be reduced.

It should be noted that the preferred embodiments of the present invention described above are merely illustrative. To avoid redundancy, all the possible combinations of changes are not documented in detail. However, it shall be understood by those skilled in the art that each of the modules or elements described above may not be necessary. For the implementation of the present invention, the present invention may also contain other detailed, conventional modules or elements. Each module or component is likely to be omitted or modified depending on the needs. Other modules or elements may not necessarily exist between two of any modules. Furthermore, it is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. An artificial intelligence voice interaction method for a user to employ a near-end electronic device and can be fulfilled by a remote artificial intelligence server, the method comprising the following steps:
    receiving a voice input by the user;
    when a sound energy comparison value is greater than a start threshold, recording the voice first, then transmitting the voice to the remote artificial intelligence server;
    determining whether the voice has ended by the near-end electronic device;
    calculating a sound energy value and a previous sound energy;
    comparing the sound energy value with the previous sound energy value to obtain the sound energy comparison value;
    determining whether the sound energy comparison value is less than an end threshold;
    if the sound energy comparison value is less than the end threshold, determining whether the sound energy comparison value is not greater than the start threshold and is not less than the end threshold within a time interval;
    if the sound energy comparison value is not greater than the start threshold and not less than the end threshold within the time interval, it is determined that the voice has ended;
    when the voice is determined to be ended by the near-end electronic device or a stop recording signal is transmitted by the remote artificial intelligence server, the voice is stopped recording, then stopped transmitting to the remote artificial intelligence server; and
    receiving a response signal sent back from the remote artificial intelligence server.

2. The artificial intelligence voice interaction method as claimed in claim 1, wherein the step of determining whether the voice has ended includes determining whether the voice is a complete sentence.

3. The artificial intelligence voice interaction method as claimed in claim 1, wherein the sound energy value is calculated every 0.2 sec.

4. The artificial intelligence voice interaction method as claimed in claim 1, wherein the time interval is 0.6 sec.

5. The artificial intelligence voice interaction method as claimed in claim 1, stops recording the voice after recording for more than 10 sec.

6. A non-transitory computer-readable storage medium used in a near-end electronic device for implementing the method as claimed in claim 1.

7. A near-end electronic device, used by a user and connected to a remote artificial intelligence server via a network, the near-end electronic device comprising:
    a microphone, which is used for receiving a voice input by the user; a transmission module, which is electrically connected to the microphone for transmitting the voice to the remote artificial intelligence server; a near-end processing module, which is electrically connected to the transmission module;
    a sound energy calculation module, which is used for calculating a sound energy and a previous sound energy to obtain a sound energy comparison value, the near-end processing module determining whether the sound energy comparison value is greater than a start threshold or less than an end threshold; if the sound energy comparison value is greater than the start threshold, the near-end processing module records the voice, then transmits the voice to the remote artificial intelligence server; if the sound energy comparison value is less than the end threshold, the near-end processing module determining whether the sound energy comparison value is not greater than the start threshold and is not less than the end threshold within a time interval; if the sound energy comparison value is not greater than the start threshold and not less than the end threshold within the time interval, then the near-end processing module determining that the voice has ended; wherein when the near-end processing module determining that the voice has ended or a stop recording signal is transmitted by the remote artificial intelligence server, it stops recording the voice, then stops transmitting the voice to the remote artificial intelligence; and a voice module, which is electrically connected to the near-end processing module for emitting a response signal sent back from the remote artificial intelligence server.

8. The near-end electronic device as claimed in claim 7, wherein the near-end processing module determines whether the voice is a complete sentence to know if the voice has ended.

9. The near-end electronic device as claimed in claim 7, wherein the sound energy calculation module calculates the sound energy comparison value every 0.2 sec.

10. The near-end electronic device as claimed in claim 7, wherein the time interval is 0.6 sec.

11. The near-end electronic device as claimed in claim 7, wherein the near-end processing module stops recording the voice after the recording time exceeds 10 sec.

12. An artificial intelligence voice interaction method for a user to employ a near-end electronic device and can be fulfilled by a remote artificial intelligence server, the method comprising the following steps:

receiving a voice input by the user;

transmitting the voice to the remote artificial intelligence server;

calculating a sound energy value and a previous sound energy by the near-end electronic device;

comparing the sound energy value with the previous sound energy value to obtain the sound energy comparison value;

determining whether the sound energy comparison value is less than an end threshold;

if the sound energy comparison value is less than the end threshold, determining whether the sound energy comparison value is not greater than a start threshold and is not less than the end threshold within a time interval;

if the sound energy comparison value is not greater than the start threshold and not less than the end threshold within the time interval, it is determined that the voice has ended;

when determining that the voice has ended and has not received a stop recording signal transmitted by the remote artificial intelligence server, it stops transmitting the voice to the remote artificial intelligence server;

before determining that the voice has ended, and has received the stop recording signal from the remote artificial intelligence server, it stops transmitting the voice to the remote artificial intelligence server; and receiving a response signal sent back from the remote artificial intelligence server.

13. The artificial intelligence voice interaction method as claimed in claim 12, wherein when the sound energy comparison value is greater than the start threshold, the step of recording the voice is performed.

14. The artificial intelligence voice interaction method as claimed in claim 13, further comprising the following steps:

recording the voice first before transmitting the voice to the remote artificial intelligence server; and stopping recording the voice before stopping transmitting the voice to the remote artificial intelligence server.

15. The artificial intelligence voice interaction method as claimed in claim 14, wherein the step of determining whether the voice has ended includes determining whether the voice is a complete sentence.

* * * * *